US005687619A

United States Patent [19]
Bryne

[11] Patent Number: 5,687,619
[45] Date of Patent: *Nov. 18, 1997

[54] CLIPLESS BICYCLE PEDAL

[76] Inventor: Richard M. Bryne, 13039 Caminito Del Rocio, Del Mar, Calif. 92014

[*] Notice: The term of this patent shall not extend beyond the expiration date of Pat. No. 5,606,894.

[21] Appl. No.: 754,690

[22] Filed: Nov. 21, 1996

Related U.S. Application Data

[63] Continuation of Ser. No. 511,726, Aug. 7, 1995, Pat. No. 5,606,894, which is a continuation-in-part of Ser. No. 235,294, Apr. 29, 1994, abandoned.

[51] Int. Cl.$^6$ ............... G05G 1/14; B62M 3/10
[52] U.S. Cl. ............... 74/594.6; 74/594.4
[58] Field of Search ............... 74/594.6, 594.4; 36/131, 132

[56] References Cited

U.S. PATENT DOCUMENTS

| 3,964,343 | 6/1976 | Lauterbach | 74/594.6 |
|---|---|---|---|
| 4,298,210 | 11/1981 | Lotteau et al. | 280/259 |
| 4,640,151 | 2/1987 | Howell | 74/594.6 |
| 4,685,351 | 8/1987 | Pegg | 74/594.4 |
| 4,739,564 | 4/1988 | Eser | 36/131 |
| 4,803,894 | 2/1989 | Howell | 74/594.6 |
| 4,815,333 | 3/1989 | Sampson | 74/594.6 |
| 4,864,887 | 9/1989 | Rapisarda | 74/594.6 |
| 4,942,778 | 7/1990 | Bryne | 74/594.6 |
| 5,046,382 | 9/1991 | Steinberg | 74/594.6 |
| 5,213,009 | 5/1993 | Bryne | 74/594.6 |
| 5,251,508 | 10/1993 | Robbins | 74/594.6 |
| 5,284,066 | 2/1994 | Weiss | 74/594.6 |
| 5,325,738 | 7/1994 | Bryne | 74/594.6 |
| 5,553,516 | 9/1996 | Weiss | 74/594.6 |
| 5,606,894 | 3/1997 | Bryne | 74/594.6 |

FOREIGN PATENT DOCUMENTS

| 3149345 | 12/1981 | Germany. |
|---|---|---|
| 3315282 | 10/1984 | Germany. |
| 3426103 | 1/1986 | Germany. |
| 3724578 | 1/1988 | Germany. |
| 8806315 | 8/1988 | WIPO. |

OTHER PUBLICATIONS

Bebop Incorporated Brochure, Sep. 1996.
"Die Geniale Pedal–Revolution"—*Tour* Magazine (Germany), Oct. 1992.
"Bryne X/2 Automatic Pedal System", *I.D. Annual Design Review*, 1993.
"Clipless, The Sequel", *Bicycle Guide* vol. 10, No. 8, Aug., 1993, pp. 42–45, p. 52.
"The Stuff Dream Bikes Are Made Of", *Road Bike Action*, Dec. 1994, pp. 26–30.
"Charge Of The Light Brigade", *Winning*, Jan. 1994, pp. 54–56.
"Das Bryne–Pedal von Speedplay: Neue Freiheit Auf Dem Rund–Klotz", Article in *Tour Rad Magazin*, Oct. 1992.

(List continued on next page.)

Primary Examiner—Charles A. Marmor
Assistant Examiner—Mary Ann Battista
Attorney, Agent, or Firm—Brown, Martin, Haller & McClain

[57] ABSTRACT

The improved clipless pedal comprises an assembly of a generally rounded body having a top surface, a bottom surface, and circumferential edge with a metal insert. A recessed area is formed extending diametrically across each of the top and bottom surfaces. The metal insert fits within the recessed area with its top surface generally flush with the surface in which it is placed. An inset is cut into the circumferential edge to form a chord across each end of the recessed areas. The diametric distance between the insets corresponds to the spacing between the spring-biased tongues of the locking mechanism of the cleat in their relaxed condition. The pedal body is formed from a lightweight plastic or polymer. In an alternate embodiment, means are provided for varying float range of the pedal with respect to the cleat by narrowing the angle within the recessed area.

20 Claims, 2 Drawing Sheets

OTHER PUBLICATIONS

*Pedals Put New Spin On Weight and Efficiency*, by Lennard Zinn in *VeloNews*, Jun. 22, 1992.
Advertisement in *Triathlon Today*, Jun., 1992.
Advertisement in *Triathelete*, Jun. 1992.
New Products, *Bicycling* Magazine Jul., 1992, p. 25.
Advertisement in *VeloNews*, Jul. 6, 1992, p. 19.
*Totally Tech, Bicycling*, Magazine Apr. 1991, p. 184.
Article in *Triathlon Today*, Dec., '91, Jan., '92, p. 35.
Article in *Bicycle Retailer & Industry News*, Jan./Feb., 1992.
*New Trader Products, Bicycle Trader*, (U.K.), Apr., 1992.
Advertisement in *Triathlete*, (U.K.), May, 1992.
"*Bryne X/2 Pedal by Speedplay*", by Tom Demerly, *Triathlon Today*, May, 1992; p. 45.
"*What's Hot*", by John Derven, *Bicycle Guide*, Jun., 1992.
*Bryne Speedplay Pedal System, Cycle Plus*, (U.K.), Jun., 1992.

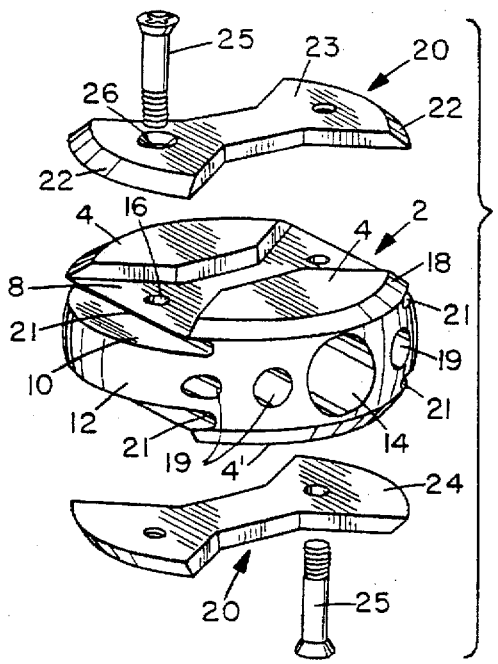
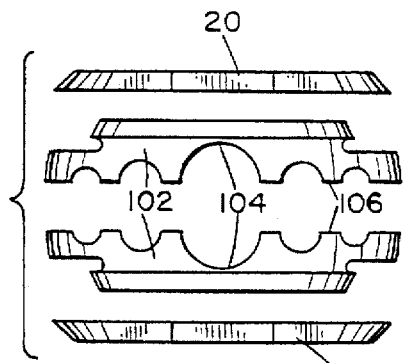
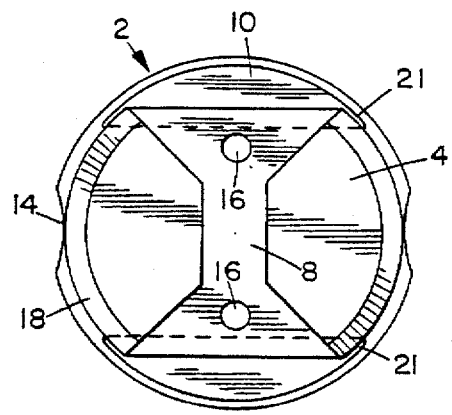
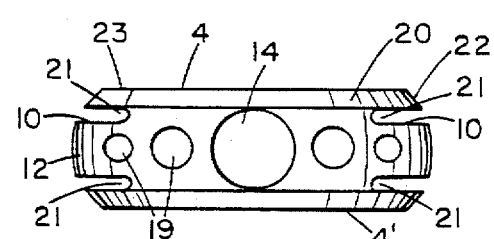
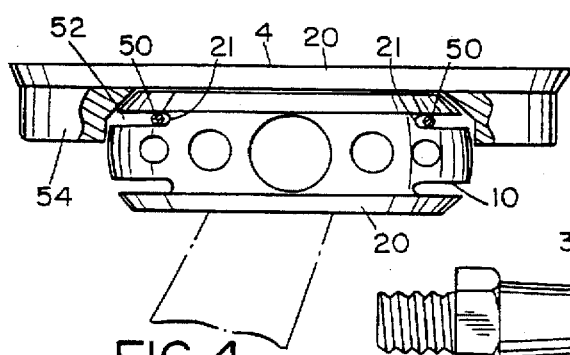
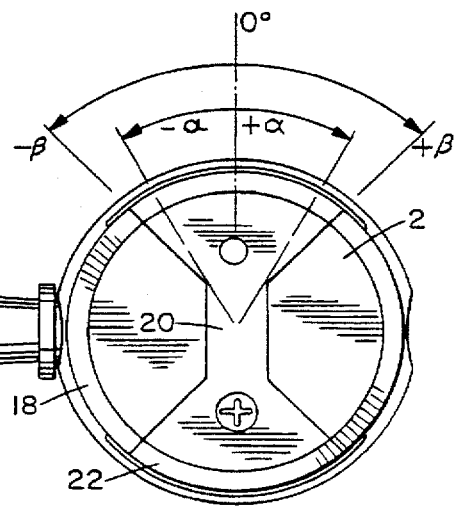
FIG. 1
FIG. 6
FIG. 2
FIG. 3
FIG. 4
FIG. 5

CLIPLESS BICYCLE PEDAL

This is a continuation of application Ser. No. 08/511,726, filed Aug. 7, 1995, now U.S. Pat. No. 5,606,894, which is a continuation-in-part of application Ser. No. 08/235,294 filed Apr. 29, 1994, now abandoned.

BACKGROUND OF THE INVENTION

Clipless pedals are perhaps the most common upgrades made to a bicycle, whether the bicycle is intended for road or mountain biking. The many advantageous afforded by clipless pedals include comfort, weight reduction and aerodynamics.

A number of clipless pedal designs have been made commercially available. Among the more popular of these designs is the pedal system disclosed in U.S. Pat. Nos. 4,942,778 and 5,213,009 of the present inventor, which are incorporated herein by reference. The cleat and pedal combination described in these patents was the first system which located the locking mechanism within the cleat instead of on the pedal. Among other advantages, the placement of the locking mechanism, which consists of a pair of diametrically opposed inwardly biased tongues or wires, allows the pedal to be symmetrical, such that either the top or the bottom of the pedal can be mated with the cleat. This improvement makes it significantly easier to engage the pedal with the cleat, which has been a major drawback with other clipless pedals. Another major feature of these pedal systems is that they provide a generous "float range", which is the degree of rotation that the rider's foot will have without actually disengaging the locking mechanism. Typically the pedal systems disclosed in these patents permit over 30° of float compared with 0<-9° for other commercial pedal systems. The advantage of as large range of float is that it eliminates restrictions on the natural rotation of the leg during pedaling. Nonetheless, some riders who have become accustomed to the restrictive nature of other clipless pedal systems have experienced a level of discomfort with the virtually frictionless movement after changing over to the patented system.

With the availability of improved clipless pedal designs, efforts have been directed toward decreasing the weight of the pedal systems. While lightweight metals such as titanium are commonly incorporated into bicycle technology, mass production using these metals requires expensive and time consuming machining steps. On the other hand, high strength impact resistant plastics, although lightweight and easy to mold, still may not possess the strength to withstand the repeated stresses and impacts of engaging and disengaging a locking mechanism.

It would be desirable to provide a pedal of composite construction which exploits the advantages of both metal and plastics while simultaneously avoiding the negative aspects of each material. It would also be desirable to provide a means for controlling the float range to permit riders to adapt the clipless pedal system to their own comfort level.

SUMMARY OF THE INVENTION

It is an advantage of the present invention to provide a clipless bicycle pedal which is lightweight and economical to manufacture.

It is a further advantage of one embodiment of the present invention to provide a means for selecting a float range.

In an exemplary embodiment, the clipless pedal comprises an assembly of a generally rounded body having a top surface, a bottom surface, and circumferential edge with a metal insert. A recessed area is formed extending diametrically across each of the top and bottom surfaces. The metal insert fits within the recessed area with its top surface generally flush with the surface in which it is placed. An inset is cut into the circumferential edge to form a chord across each end of the recessed areas. The diametric distance between the insets corresponds to the spacing between the spring-biased tongues of the locking mechanism of the cleat in their relaxed condition. The insert has rounded edges which extend beyond the inset so that an overhanging lip is formed. The edges of the top and bottom surfaces and the rounded ends of the insert are beveled to facilitate insertion of the pedal into the cleat.

The pedal body has a bore extending diametrically at least partially therethrough into which a pedal spindle may be inserted so that the pedal rotates freely around the axis of the spindle. The circumferential edge of the pedal body is generally convex.

The body material is a lightweight impact resistant plastic or polymer, so that the only portion of the pedal assembly that is metal is the insert and fasteners. This results in a strong and very lightweight pedal which is easy to manufacture.

In an alternate embodiment, the ability to adjust the float range is provided by means of one or two pegs or screws which are disposed so that they extend into the inset areas of the pedal. In the preferred embodiment, bores in the vertical sidewall of the insets are threaded to accept a set-screw which will extend horizontally into the inset area toward a centerline running through the recessed area (front-to-back of the pedal). The screws are fully recessed into the bores for full range of float and are backed out so that they extend into the inset area to contact the edges of the springbiased tongues of the locking mechanism. The amount of intrusion of the screws into the inset area determines the amount of limitation of the float, which may be decreased to a range on the order of 10°. Other extensions into the inset area may be used, including pegs formed in the ends of the metal inserts which extend inward toward the planar center of the pedal body. Also, rotatable cams or other variable diameter inserts can be attached to either the plastic pedal body or the metal inserts.

BRIEF DESCRIPTION OF THE DRAWINGS

Understanding of the present invention will be facilitated by consideration of the following detailed description of the preferred embodiments of the present invention, taken in conjunction with the accompanying drawings, in which like reference numerals refer to like parts in and which:

FIG. 1 is an exploded perspective view of the improved pedal according to the present invention;

FIG. 2 is a top view of the pedal body;

FIG. 3 is a side elevation of the pedal of the present invention;

FIG. 4 is a side elevation of the pedal engaged in the locking mechanism of a cleat with the cleat partially cut away;

FIG. 5 is a top elevation of an assembled pedal mounted on a spindle;

FIG. 6 is an exploded side view of an alternate embodiment of the pedal;

DESCRIPTION OF THE PREFERRED EMBODIMENTS

Figure 7:
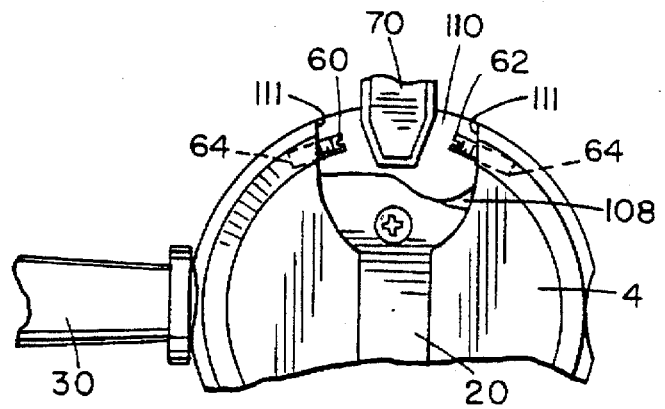
FIG. 7 is a partial top view of the pedal body, partially cut away, to show a first embodiment of the float adjusting means.

As illustrated in FIGS. 1–3, the pedal assembly comprises body 2 and inserts 20. Body 2 is preferably circular and disc-like, and is symmetrical along a plane bisecting the body so that the top surface 4 and bottom surface 4' are mirror images of each other. Other shapes may also be used including squares, rectangles, ovals, etc. Alternatively, the body may be hollow and open, e.g., cylindrical. For purposes of further description, references to the top surface 4 are equally applicable to the bottom surface 4'. Also for purposes of description, positions on the pedal will be described relative to how they would be oriented if the pedal were mounted on a bicycle, e.g., leading and trailing edges, innermost edge, etc.

A recessed area 8 is formed in the top surface 4 extending diametrically across its entire width so that it intersects the circumferential edge 12 at the leading and trailing edges of the pedal. Peripheral or circumferential edge 12 is preferably convex to give the body 2 an at least partially curved profile. A bore 14 extends at least part way through the body 2, perpendicular to the circumferential edge 12 at the innermost side of the body, for retaining a pedal spindle 30, as illustrated in FIG. 5, and any bearings associated therewith, as is known in the art.

Figure 9:
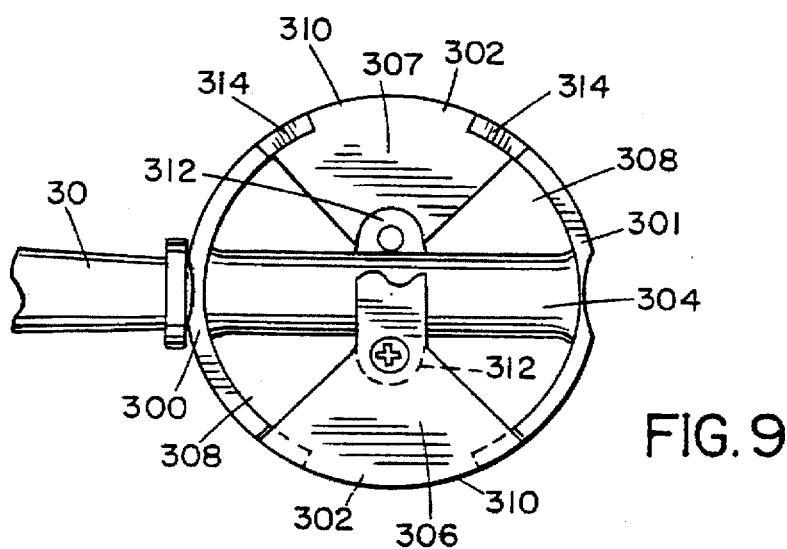
FIG. 9 is a top view of an alternate embodiment of the pedal body with the top insert partially cut away.

The outermost ends of the recessed area 8 are cut to form an inset 10. The cut may have a straight or angled vertical wall, but preferably, a curved channel is formed, as illustrated in FIG. 3. The curvature of channel 21 should generally match the radius of the tongue portion of the locking mechanism, and the separation of the channels diametrically across the body should be substantially equal to the separation between two inwardly biased tongue portions of a locking mechanism. (See, e.g., FIG. 4.)

Where the body is hollow, the engaging area of the pedal will consist of cut-ins 302 into the sidewalls of the body edges, so that the body is essentially two semi-circles 300, 301 mounted on a bearing sleeve 304, as illustrated in FIG. 9. Recessed 314 on each side of the cut-ins 302 allow the top surface of the inserts to be flush with the rim 316 of the body. The inserts 306, 307 span the open center 308 of the body, overhanging the cut-ins 302 to provide the edge 310 which will engage the cleat locking mechanism. Top insert 306 is partially cut away, revealing the inner surface of insert 307. As in the other embodiments, the inserts may be beveled on the outer surface of edge 310 to facilitate engagement of the pedal and cleat. Means for attaching the insert to the pedal body may be provided by extensions 312 of the bearing sleeve.

The inset 10 is preferably slightly curved inward to form a crescent shape, tapering off at the tips of the crescent to only a shallow width. The gradient of the width of the inset causes a variable pedal diameter as seen by the tongues of the locking mechanism. For example, the separation between channels 21 is generally constant when rotating the body around its radial center within the angle range indicated as $-\alpha$ to $+\alpha$ in FIG. 5. This varying pedal diameter is key to the function of the locking mechanism. The shortest effective pedal diameter as seen by the locking mechanism exists along the line indicated by 0° in FIG. 5. This is also apparent from FIG. 3 by comparing the distance across the pedal body from the right hand channel 21 to the left hand channel 21. As the pedal body is rotated with respect to the locking mechanism within the range $-\alpha$ to $+\alpha$, the locking mechanism remains engaged, allowing the rider's foot to float. Although there may be a slight increase in pedal diameter as seen by the tongues of the locking mechanism through this range, it is not enough to push the tongues out of the channels 21. Beyond the range of $-\alpha$ to $+\alpha$, the effective diameter of the pedal as seen by the tongues is sufficient to push the tongues out of the channels. Then, by lifting the foot away from the pedal, the locking mechanism is completely disengaged. Typically, $\alpha$ is within the range of 25°–35°, however, it should be noted that the angles $\alpha$ and $\beta$ can be varied by changing the lengths of the inset 10 and channel 21. These lengths will be less for sooner disengagement upon rotation of the rider's foot and greater for later disengagement.

To engage the pedal in the locking mechanism, the pedal is pushed against the tongues so that the beveled ends 22 of the metal insert provide an increasing outward force on the tongues, spreading them apart until they pass the very tips of the ends 22, at which point they resile back into the area under the ends 22 of the insert and the channels 21. A similar interaction can be obtained by locating the bevels on the tongue portions, but this may not be as effective.

The insert 20 has a top surface 23, a bottom surface 24, rounded ends 22 which are beveled on the top surface 23, and at least two bores 26 therein. One or both of the bores are threaded and one or both of the bores are countersunk so that the heads of screws 25 which are used to fasten the insert 20 to the pedal body 2 are flush with the top surface 23. As illustrated in FIG. 1, the screws 25 are inserted from opposite sides of the pedal body so that each insert has one countersunk bore and one threaded bore. By sandwiching the pedal body between the inserts, it is not necessary to thread the bores 16 of the body itself since the screws 25 will pass completely through the pedal body to engage the insert on the opposite side of the pedal body. This further simplifies the manufacturing process.

The insert 20 is made from a strong, lightweight metal, such as stainless steel or titanium. Other metals, or high strength polymers and composites may also be appropriate. The shape of the insert 20 is limited only to the extent that it must extend diametrically across the pedal body to provide sufficient overhang over channels 21 to retain the tongue of the locking mechanism when the pedal and cleat are engaged. The insert 20 should be symmetrical, e.g., a rectangular or oval shape. In the preferred embodiment, the insert is shaped like a bow tie, i.e., two rounded base triangles connected by a narrow rectangular neck. This bow tie shape provides the desired edge circumference at ends 22 to allow a wide range of float for the rider's foot while using a minimum amount of metal to keep the pedal as light as possible. The recessed area 8 of pedal body 2 should be shaped to conform to the insert shape and of such a depth that the top surface 21 of the insert is generally flush with the top surface 4 of the pedal body. A close fit between the insert 20 and the sidewalls of recessed area 8 should be assured so that dirt and moisture do not build up in the spaces therebetween. It may also be possible to create two rounded base triangles as separate pieces. However, the reinforcement provided by the rectangular neck is lost, and the assembly process may be complicated somewhat by requiring four smaller pieces to be handled for each pedal.

The pedal body 2 is molded of a lightweight impact resistant plastic or polymer, such as Ultem™

(polyetherimide). The pedal body 2 can be molded in one piece or two pieces, the latter forming a pair of shells which can be clamped together when the inserts 20 are attached.

The two piece body is illustrated in FIG. 6. Each half has a shell-like shape which joins to the other half along edges 106. This configuration provides the advantage that, when the body halves 102 are formed from a self-lubricating material such as Teflon™ (polytetrafluoroethylene) or a composite thereof, or the channels 104 which combine to make up the bore for retaining the spindle are lined with the self-lubricating material, the pedal spindle can be rotatably retained therein without requiring separate bearings. This provides an inexpensive variation of the pedal since the molding process itself is further simplified and the need for costly precision bearings is eliminated. During assembly, the two halves 102 can be closed around the spindle to hold it in place, further simplifying the manufacturing process.

In order to provide expansion release for the molding process, and to further decrease the weight of the pedal body 2, bores 19 are created, running parallel to bore 14. Bores 19 may run fully through the pedal body 2, or may only run part way. When locating bores 19, consideration should be made of the locations of bores 16 since the actual intersection of the perpendicular bores might diminish the pedal's structural integrity.

As can be seen in FIG. 4, the exemplary locking mechanism comprises a rounded spring wire 50, such as that disclosed in U.S. Pat. No. 5,213,009, which extends across the open cavity 52 of the cleat 54. The depth of cavity 52 and the thickness of pedal body 2 allow the top channels 21 to capture the spring wire 50 with sufficient strength to prevent the pedal and cleat from being disengaged without rotating one relative to the other to the predetermined angle. Other embodiments of the locking mechanism as disclosed in the '778 patents may also be used.

Figure 8:
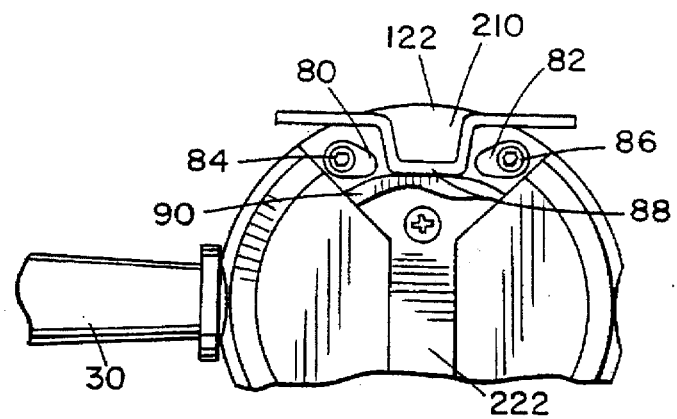
FIG. 8 is a partial top view of the pedal body, partially cut away, to show a second embodiment of the float adjusting means.

An alternate embodiment which permits variation of the float range is illustrated in FIG. 7. Ideally the outward float, meaning the angle that the heel of the rider's foot can be rotated away from the bicycle, towards the disengaging position, will be selectable within the range of 0° (no rotation) to 28° without disengaging. The inward float, rotation of the heel toward the bicycle, will be selectable within the range of 0° (no rotation) to 10°. Here, recessed area 108 and inset area 110 are formed to permit insertion of set screws 60 and 62 into the vertical walls 111 of the inset area 110 such that they extend into inset area 10 to effectively decrease its width, thus decreasing the amount of rotation available to the engaging tongue 70. This may require a shallower angle within the recessed area 108, so that the vertical walls 111 are approximately parallel to each other. Otherwise, the pedal body 4 and insert 20 are unchanged from previously described embodiments. Set screws 60 and 62, which uses conventional means for adjustment, may be screwed into and out of threaded bores 64 and 66 formed in the inset walls to change the effective width of inset 110. In order to enhance the effectiveness of the adjustability feature, the locking mechanism of the cleat should have a protruding part, either a spring-loaded tongue 70 or a spring wire with an inward bend, as shown in FIG. 8. The protruding tongue is beveled on its edges to contact the outer ends of set screws 60 and 62. The more the set screws 60 and 62 extend into the inset area 110, the more limited the movement of the tongue 70 therein. When a beveled edge of tongue 70 contacts one of the set screws, the spring-loaded tongue is forced outward, permitting the cleat to be lifted away from the pedal. The screws 60 and 62 need not be symmetrical as far as the distance they extend into the inset area.

A second embodiment of the float adjusting means is illustrated in FIG. 8. A pair of rotatable cams 80 and 82 are attached to the inside ends of one or both of the metal inserts 122 and 222 so that they protrude into the inset area 210. The recessed area 90 extends only as far as needed to provide support for the inserts 122 and 22 and to permit attachment of the inserts to the pedal body. If the cams 80 and 82 are of sufficient height to span the vertical spacing between the two metals inserts 122 and 222, then they need be attached to only one of the insert, and provision must be made for attachment of the cams to the inserts, usually by a threaded bore for receiving screws 84 and 86. For manufacturing purposes, it may be more expedient to mold or form each metal insert to be identical rather than having two separate inserts. In this case, even though the cams 80 and 82 will be attached to only one of the metal inserts, both inserts can have the threaded bores therein for receiving the screws.

Adjustment of the spacing between the cams 80 and 82 provides means for varying the float range. Screws 84 and 86 are loosened to permit cams 80 and 82 to be rotated to widen or narrow the spacing within which the tongue extension 88 fits, then tightened again so that the cams will not rotate when contacted by the edges of extension 88. The narrower the spacing, the more limited the float. Other non-circular shapes which have variable radii may be used to provide adjustability. Adjustability may also be provided by attaching pegs to, or forming unitary pegs with the metal inserts. The pegs would be fixed in position, and adjustability would be enabled by replacing the entire metal insert with another metal insert with fixed pegs that have larger or smaller spacing.

It should be noted that, while the pedal is described herein as engaging a locking mechanism at its leading and trailing edges, the engaging portions of the pedal can also be oriented at a non-zero angle with respect to 0° (shown in FIG. 5) by rotating the recessed areas and insets around the center of the pedal body. The engaging portions of the pedal should remain offset on the order of 180° from each other, although some deviation from that angle would be acceptable as long as sufficient opposing inward forces were provided to lock the pedal in place. If there are more than two locking mechanisms, the angular separation between the engaging portions of the pedal will generally be 360° divided by the number of engaging portions.

It should also be noted that the locking mechanism can be reversed, with the recessed areas and bow tie portion in the cleat and the spring wire or spring-loaded tongue on one or both sides of the pedal.

It will be evident that there are additional embodiments and applications which are not disclosed in the detailed description but which clearly fall within the scope and spirit of the present invention. The specification is, therefore, not intended to be limiting, and the scope of the invention is to be limited only by the following claims.

I claim:

1. A bicycle pedal having a pair of engagement extensions for engaging a locking mechanism having two inwardly biased tongues separated by a first spacing, the pair of engagement extensions being engaged by the locking mechanism when a contact surface of the bicycle pedal is adjacent a cleat surface to which the locking mechanism is affixed, the bicycle pedal comprising:

a support body having a body surface, a peripheral edge having two edge insets disposed diametrically opposite each other on said support body, and a bore running at least partially diametrically therethrough for receiving a spindle, said body surface having a recessed surface at least partially recessed from the contact surface, said recessed surface extending diametrically across said support body and having two ends so that each end of said recessed surface intersects one of said two edge insets in said peripheral edge wherein a diametric separation of said two edge insets is equal to or less than the first spacing;

a planar insert having a top insert surface and a thickness corresponding to a depth of said recessed surface from the contact surface for attachment to said recessed surface and having a pair of insert edges for defining the pair of engagement extensions, a distance between said pair of insert edges being greater than the first spacing so that said pair of insert edges overhang said edge insets; and means for fastening said planar insert to said support body.

2. A bicycle pedal as in claim 1 wherein said body surface is beveled.

3. A bicycle pedal as in claim 1 wherein each of said insert edges are beveled.

4. A bicycle pedal as in claim 1 wherein said support body is formed from an impact resistant polymer.

5. A bicycle pedal as in claim 1 wherein said planar insert is formed from metal.

6. A bicycle pedal as in claim 1 wherein said support body is rounded and comprises two identical half shells.

7. A bicycle pedal as in claim 1 wherein said support body is hollow and said edge insets are cut through said peripheral edge.

8. A bicycle pedal as in claim 1, wherein each of said support body and said planar insert has a plurality of fastening bores therethrough.

9. A bicycle pedal as in claim 8, wherein said fastening means is a plurality of screws and at least a portion of said plurality of fastening bores in said planar insert are threaded for receiving a screw of said plurality of screws.

10. A bicycle pedal as in claim 8, wherein at least a portion of said plurality of fastening bores in said planar insert are countersunk for receiving a screw.

11. A bicycle pedal as in claim 1, wherein said support body is symmetrical across a lateral plane bisecting said support body so that said support body has two said body surfaces, one said body surface corresponding to each of a top and a bottom of said support body.

12. A bicycle pedal as in claim 11, wherein one said planar insert is provided for each of said top and said bottom of said support body, so that said support body is sandwiched between two said planar inserts.

13. A clipless bicycle pedal assembly, the assembly having a contact plane for contacting an interior surface of a cleat attached to a rider's shoe, the clipless bicycle pedal assembly comprising:

a support body formed from a first material and having a top surface, a bottom surface, a peripheral edge, and a bore extending at least partially therethrough from a first location on said peripheral edge toward a second location on said peripheral edge for rotatably retaining a pedal spindle therein, each of said top surface and said bottom surface having a recessed surface recessed from said contact plane, each said recessed surface extending diametrically across said support body between a first end and a second end, said peripheral edge having a pair of edge insets diametrically opposite each other at a first diameter, one edge inset of said pair of edge insets corresponding to each of said first end and said second end of each said recessed surface;

a pair of planar metal inserts, one planar metal insert of said pair for attachment over said recessed surface of each of said top surface and said bottom surface of said support body, each said planar metal insert having a pair of insert edges disposed diametrically opposite each other to define a second diameter greater than said first diameter so that when each said planar metal insert is attached to each said recessed surface, each said pair of insert edges overhangs a corresponding said pair of edge insets whereby a lip is formed over each said edge inset, each said planar metal insert having a top insert surface and an insert thickness whereby said top insert surface is flush with said contact plane when said planar metal insert is disposed on said recessed surface; and means for fastening each said planar metal insert to said support body.

14. A clipless bicycle pedal assembly system as in claim 13 wherein each said planar metal insert is stainless steel.

15. A clipless bicycle pedal assembly as in claim 13 wherein said top surface of each said planar metal insert is beveled adjacent said pair of insert edges.

16. A clipless bicycle pedal assembly as in claim 13 wherein each said recessed surface extends from a leading edge to a trailing edge of said support body.

17. A clipless bicycle pedal assembly as in claim 13 wherein each said recessed surface and each of said pair of planar metal inserts are shaped as a bow tie.

18. A clipless bicycle pedal assembly as in claim 13 wherein said support body is hollow and said edge insets are cut through said peripheral edge.

19. A clipless bicycle pedal assembly as in claim 13, wherein each of said support body and said pair of planar metal inserts has a plurality of fastening bores therethrough.

20. A clipless bicycle pedal assembly as in claim 19, wherein said fastening means is a plurality of screws and at least a portion of said plurality of fastening bores in each said planar metal insert are threaded for receiving a screw of said plurality of screws.

* * * * *

Disclaimer

5,687,619—Richard M. Bryne, Del Mar, Calif. CLIPLESS BICYCLE PEDAL. Patent dated November 18, 1997. Disclaimer filed January 2, 2001, by the assignee, Speedplay, Inc.

Hereby enters this disclaimer to the remaining term of said patent.
*(Official Gazette, May 8, 2001)*